United States Patent
Ham et al.

(10) Patent No.: US 10,569,677 B1
(45) Date of Patent: Feb. 25, 2020

(54) SEAT ASSEMBLY FOR ABSORBING ENERGY FROM A REAR OCCUPANT IN FRONT COLLISION

(71) Applicants: Toyota Motor Engineering & Manufacturing North America, Inc., Plano, TX (US); Toyota Jidosha Kabushiki Kaisha, Toyota-shi Aichi-ken (JP)

(72) Inventors: Suk Jae Ham, Ann Arbor, MI (US); Preston Jerome Lemanski, Ypsilanti, MI (US); Yosuke Ota, Aichi (JP); John P. Kim, Ann Arbor, MI (US); MaryEllen Claire Hunt, Ann Arbor, MI (US)

(73) Assignees: Toyota Motor Engineering & Manufacturing North America, Inc., Plano, TX (US); Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 11 days.

(21) Appl. No.: 16/113,003

(22) Filed: Aug. 27, 2018

(51) Int. Cl.
*B60N 2/42* (2006.01)
*B60N 2/427* (2006.01)
(Continued)

(52) U.S. Cl.
CPC .......... *B60N 2/433* (2013.01); *B60N 2/0276* (2013.01); *B60N 2/2227* (2013.01);
(Continued)

(58) Field of Classification Search
CPC ...... B60N 2/42745; B60N 2/002; B60N 2/22; B60N 2/2227; B60R 2021/01279; B60R 2021/0273; B60R 21/0136; B60R 21/02
See application file for complete search history.

(56) References Cited

U.S. PATENT DOCUMENTS

| 5,727,847 A | 3/1998 | Martone et al. |
| 7,931,332 B2 | 4/2011 | Andou et al. |

(Continued)

FOREIGN PATENT DOCUMENTS

| CA | 2577159 A1 | 8/2007 |
| JP | 3543596 B2 | 7/2004 |
| KR | 101513256 B1 | 4/2015 |

OTHER PUBLICATIONS

Taylor, Amanda M. et al., "Effect of passenger position on crash injury risk in transport-category aircraft", Civil Aerospace Medical Institute, Federal Aviation Administration, Sep. 2015.

*Primary Examiner* — Shin H Kim
(74) *Attorney, Agent, or Firm* — Dinsmore & Shohl LLP (57) ABSTRACT

A seat assembly includes a seat cushion frame, a seat back frame, a bracket, a pin actuator, a sensor, and an electronic control unit. The seat back frame is pivotally connected to the seat cushion frame about a pivot axis. The bracket is fixed to the seat cushion frame. The bracket includes a cam surface, and a distance between the cam surface and the pivot axis varies along the cam surface. The pin actuation includes a pin. The pin actuator is fixed to the seat back frame. The pin actuator is configured to move the pin from a disengaged position to an engaged position. The electronic control unit determines whether the sensor detects the front collision of the vehicle and controls the pin actuator to move the pin from the disengaged position to the engaged position.

20 Claims, 10 Drawing Sheets

(51) Int. Cl.
  *B60R 21/013* (2006.01)
  *B60R 21/0132* (2006.01)
  *B60N 2/433* (2006.01)
  *B60N 2/22* (2006.01)
  *B60N 2/235* (2006.01)
  *B60N 2/02* (2006.01)

(52) U.S. Cl.
  CPC ......... *B60N 2/2362* (2015.04); *B60N 2/4221* (2013.01); *B60N 2/4279* (2013.01)

(56) References Cited

U.S. PATENT DOCUMENTS

| | | | |
|---|---|---|---|
| 8,033,602 B2 | 10/2011 | Yamaki et al. | |
| 9,376,078 B1 | 6/2016 | Li et al. | |
| 2009/0140559 A1* | 6/2009 | Andou | B60R 21/0136 297/216.1 |
| 2014/0265475 A1* | 9/2014 | Fujii | B60N 2/002 297/217.1 |
| 2018/0065581 A1* | 3/2018 | Ohno | B60R 21/01558 |
| 2019/0072426 A1* | 3/2019 | Tomatsu | B60R 21/01512 |

\* cited by examiner

SEAT ASSEMBLY FOR ABSORBING ENERGY FROM A REAR OCCUPANT IN FRONT COLLISION

TECHNICAL FIELD

The present specification generally relates to seat assemblies for a vehicle and, more specifically, seat assemblies that absorb energy from an occupant reward of the seat assemblies during a front collision.

BACKGROUND

In vehicles having a seat assembly positioned forward of a rear seat assembly, a head of a rear occupant of the rear seat assembly is exposed to a higher change of contacting the front seat assembly in a frontal collision. During a frontal collision, the knees of the rear occupant initially contact a rear surface of a seat back of the front seat assembly. However, previously known front seat assemblies do not provide for a controlled forward pivoting of a seat back to absorb energy transferred to the seat back due to the contact of the knees of the rear occupant to increasing a distance between the head of the rear occupant during a frontal collision.

Accordingly, a need exists for alternative seat assemblies that absorb energy from the contact of the rear occupant to increase a distance between the head of the rear occupant so as to reduce the occurrence of the head of the rear occupant from contacting the front seat assembly.

SUMMARY

In accordance with one embodiment, a seat assembly for a vehicle having a floor and a rear seat assembly positioned rearward of the seat assembly is provided. The seat assembly includes a seat cushion frame, a seat back frame, a bracket, a pin actuator, a sensor, and an electronic control unit. The seat cushion frame is connected to the floor of the vehicle. The seat back frame is pivotally connected to the seat cushion frame about a pivot axis. The bracket is fixed to the seat cushion frame. The bracket includes a cam surface, and a distance between the cam surface and the pivot axis varies along the cam surface. The pin actuation includes a pin. The pin actuator is fixed to the seat back frame. The pin actuator is configured to move the pin from a disengaged position to an engaged position. In the disengaged position, the pin is spaced apart from the cam surface of the bracket. In the engaged position, the pin contacts the cam surface of the bracket to increase a force required to pivot the seat back frame about the pivot axis due to the engagement between the pin and cam surface. The sensor is configured to detect a front collision of the vehicle. The electronic control unit includes a processor and a memory unit that is coupled to the processor. The memory unit stores logic, that when executed by the processor, causes the electronic control unit to determine whether the sensor detects the front collision of the vehicle. In response to determining that the sensor detected the front collision of the vehicle, the electronic control unit controls the pin actuator to move the pin from the disengaged position to the engaged position.

In accordance with another embodiment, a vehicle having a rear seat assembly and a front seat assembly provided forward of the rear seat assembly is provided. The front seat assembly includes a seat cushion frame, a seat back frame, a bracket, a pin actuator, a sensor, and an electronic control unit. The seat cushion frame is connected to the floor of the vehicle. The seat back frame is pivotally connected to the seat cushion frame about a pivot axis. The bracket is fixed to the seat cushion frame. The bracket includes a cam surface, and a distance between the cam surface and the pivot axis varies along the cam surface. The pin actuation includes a pin. The pin actuator is fixed to the seat back frame. The pin actuator is configured to move the pin from a disengaged position to an engaged position. In the disengaged position, the pin is spaced apart from the cam surface of the bracket. In the engaged position, the pin contacts the cam surface of the bracket to increase a force required to pivot the seat back frame about the pivot axis due to the engagement between the pin and cam surface. The sensor is configured to detect a front collision of the vehicle. The electronic control unit includes a processor and a memory unit that is coupled to the processor. The memory unit stores logic, that when executed by the processor, causes the electronic control unit to determine whether the sensor detects the front collision of the vehicle. In response to determining that the sensor detected the front collision of the vehicle, the electronic control unit controls the pin actuator to move the pin from the disengaged position to the engaged position.

In accordance with another embodiment, a method of absorbing energy from an occupant of a rear seat assembly contacting a front seat assembly positioned forward of the rear seat assembly is provided. The method includes providing the seat assembly with a seat cushion frame, a seat back frame, a bracket, a pin actuator, a sensor, and an electronic control unit. The seat cushion frame is connected to the floor of the vehicle. The seat back frame is pivotally connected to the seat cushion frame about a pivot axis. The bracket is fixed to the seat cushion frame. The bracket includes a cam surface, and a distance between the cam surface and the pivot axis varies along the cam surface. The pin actuation includes a pin. The pin actuator is fixed to the seat back frame. The pin actuator is configured to move the pin from a disengaged position to an engaged position. In the disengaged position, the pin is spaced apart from the cam surface of the bracket. In the engaged position, the pin contacts the cam surface of the bracket to increase a force required to pivot the seat back frame about the pivot axis due to the engagement between the pin and cam surface. The method further includes determining a presence or absence of a front collision of the vehicle, and in response to determining the presence of the front collision of the vehicle, control the pin actuator to move the pin from the disengaged position to the engaged position.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

Vehicle according to the present specification include a passenger compartment having a front seat assembly and a rear seat assembly. The front seat assembly is provided forward of the rear seat assembly. The front seat assembly may be a front driver seat or a front passenger seat and the rear seat assembly may be a second row passenger seat assembly. It is appreciated, that the front seat assembly may be provided rearward of the front driver seat and the front passenger seat and that the rear seat assembly may be provided rearward of the front seat assembly as a third row seat assembly.

The front seat assembly is configured to absorb energy due to contact between a rear occupant of the rear seat assembly and the front seat assembly. Specifically, the front seat assembly is configured to absorb energy due to contact between the rear occupant and a seat back frame of the front seat assembly. The front seat assembly provides for a controlled absorption of the energy from the contact of the rear occupant with the seat back frame to increase a distance between a head of the rear occupant so as to reduce an occurrence of the head of the rear occupant from contacting the front seat assembly.

It is noted that the terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

Figure 1:
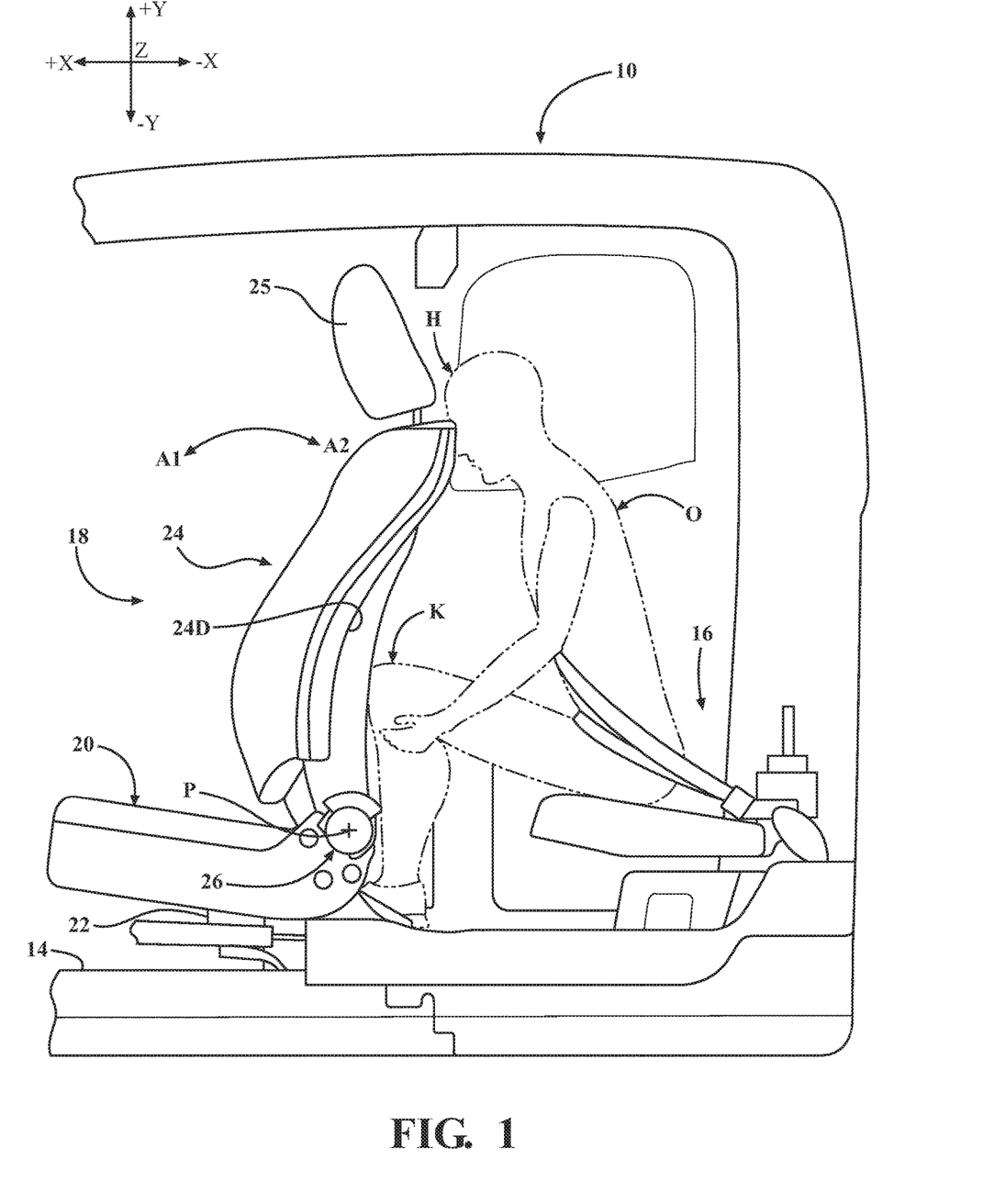
FIG. 1 schematically depicts a partial side view of an environment for a seat assembly for absorbing energy from a rear occupant during a frontal collision, according to one or more embodiments shown and described herein.

As used herein, the term "vehicle longitudinal direction" refers to the forward-rearward direction of the vehicle (i.e., in the +/− vehicle X direction depicted in FIG. 1). The term "vehicle lateral direction" refers to the cross-vehicle direction (i.e., in the +/− vehicle Z direction depicted in FIG. 1), and is transverse to the vehicle longitudinal direction. The term "vehicle vertical direction" refers to the upward-downward direction of the vehicle (i.e., in the +/− vehicle Y-direction depicted in FIG. 1). As used herein, "upper" and "above" are defined as the positive Y direction of the coordinate axis shown in the drawings. "Lower" and "below" are defined as the negative Y direction of the coordinate axis shown in the drawings.

Referring to FIG. 1, the terms "outboard" or "outward" as used herein refers to the relative location of a component in direction with respect to a vehicle centerline. The term "inboard" or "inward" as used herein refers to the relative location of a component in direction with respect to the vehicle centerline. Because the vehicle structure may be generally symmetrical about the vehicle centerline, the direction to which use of terms "inboard," "inward," "outboard" and "outward" refer may be mirrored about the vehicle centerline when evaluating components positioned along opposite sides of the vehicle.

Referring now to the drawings, FIG. 1 schematically depicts a partial side view of a vehicle 10 having a passenger compartment 12. The passenger compartment 12 includes a floor 14, a rear seat assembly 16 configured to seat a rear occupant O above the floor 14. The rear seat assembly 16 is provided rearward in the vehicle longitudinal direction of a front seat assembly 18. The rear occupant O includes a head H and knees K.

Figure 2:
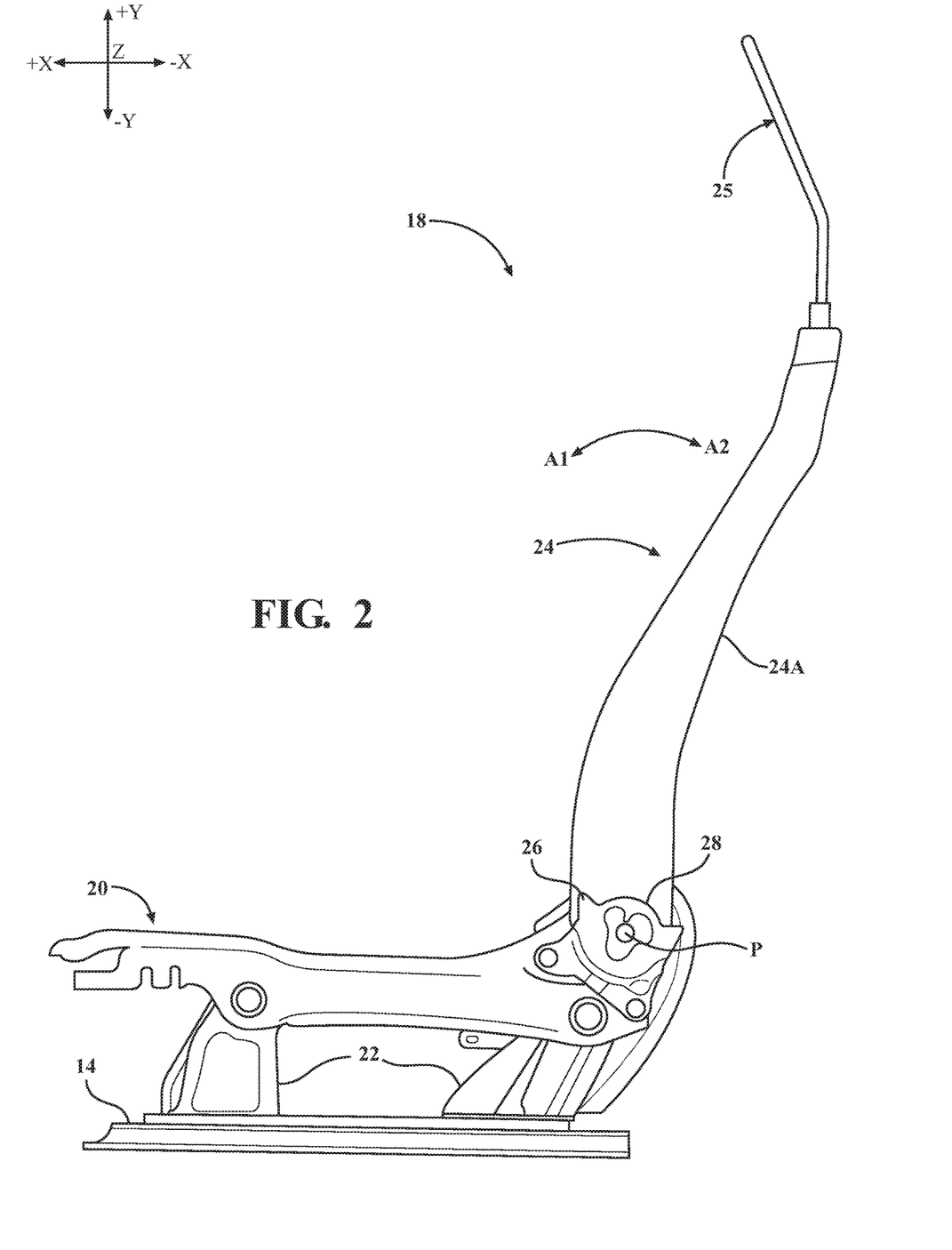
FIG. 2 schematically depicts a side view of the seat assembly of FIG. 1, according to one or more embodiments shown and described herein.

Referring to FIGS. 1 and 2, the front seat assembly 18 includes a seat cushion frame 20 connected to the floor 14 of the passenger compartment 12 of the vehicle 10. The seat cushion frame 20 is fixedly secured to the floor 14 by mounting brackets 22. In some embodiments, the mounting brackets 22 slidably connect the front seat assembly 18 to the floor 14 such that the front seat assembly 18 is slidably with respect to the floor 14. In some other embodiments, the mounting brackets 22 releasably secure the front seat assembly 18 to the floor 14 so as to allow the front seat assembly 18 to be removed from the passenger compartment 12 of the vehicle 10.

The front seat assembly 18 includes a seat back frame 24 that is pivotally connected to the seat cushion frame 20 about a pivot axis P. The seat back frame 24 is pivotal about the pivot axis P forward in the vehicle longitudinal direction in the direction of arrow A1 and pivotal about the pivot axis P rearward in the vehicle longitudinal direction in the direction of arrow A2. The seat back frame 24 includes a rear surface 24A. The seat back frame 24 includes a headrest 25.

In some embodiments, the seat back frame 24 is provided with a knee load plate on the rear surface 24A of the seat back frame 24. Specifically, the knee load plate extends across the rear surface 24A of the seat back frame 24 and corresponds to the location of the knees K of the rear occupant O that contact the rear surface 24A of the seat back frame 24 during a frontal collision.

The seat cushion frame 20 includes an energy absorbing bracket 26 fixed to a rear end 54 of the seat cushion frame 20. The bracket 26 includes a cam surface 28 that is provided on an outer peripheral surface of the bracket 26. The pivot axis P extends through a portion of the bracket 26. As the bracket 26 is fixed to the seat cushion frame 20, the bracket 26 does not pivot with respect to the seat cushion frame 20. The cam surface 28 of the bracket 26 is positioned above the pivot axis P in the vehicle vertical direction. It is appreciated, that the cam surface 28 may be positioned below the pivot axis P in the vehicle vertical direction. As will be discussed in greater detail below, a distance between the pivot axis P and the cam surface 28 varies along a length of the cam surface 28.

Figure 3A:
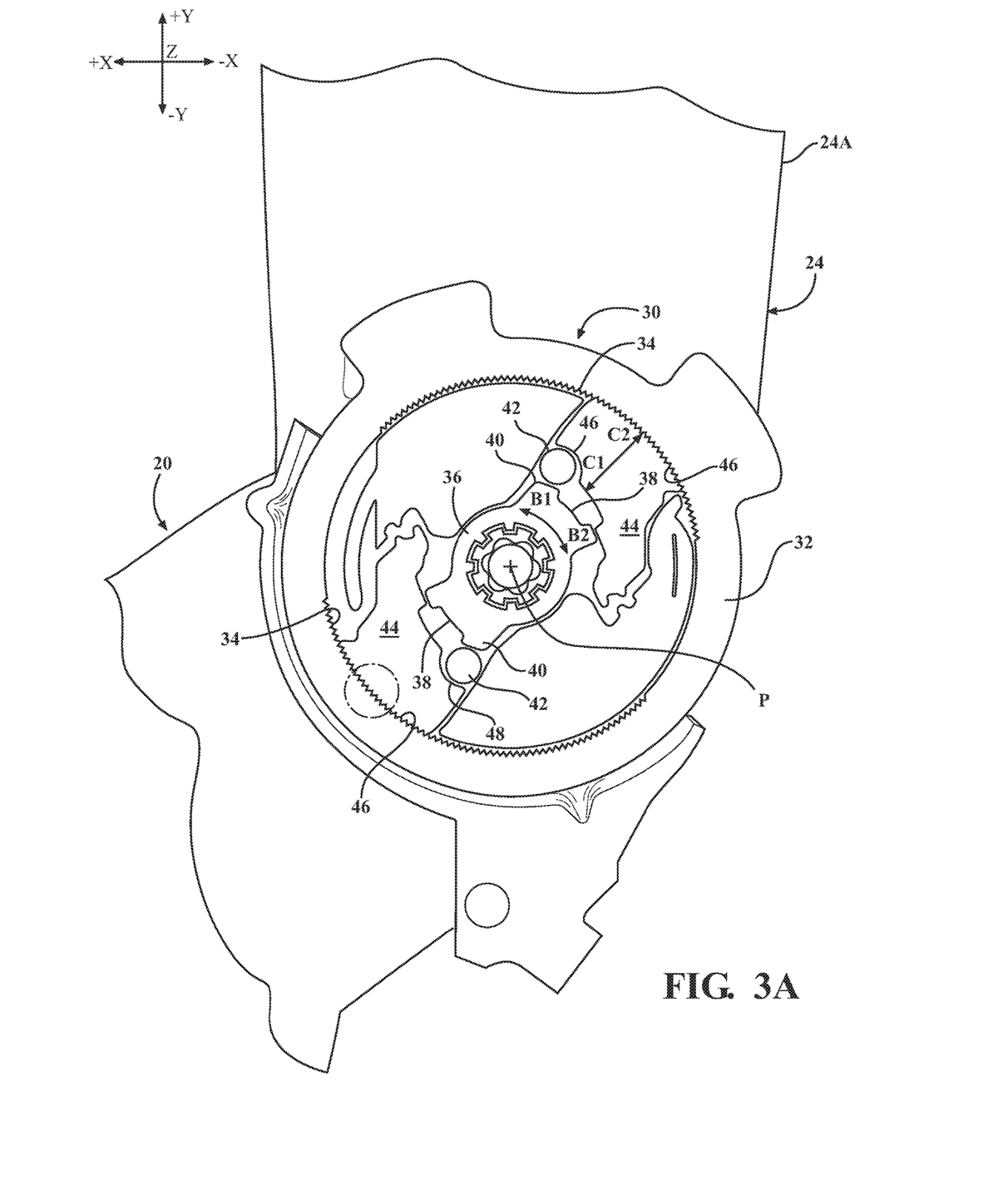
FIG. 3A schematically depicts a partial side view of a recliner mechanism of the seat assembly of FIG. 1, according to one or more embodiments shown and described herein.
Figure 3B:
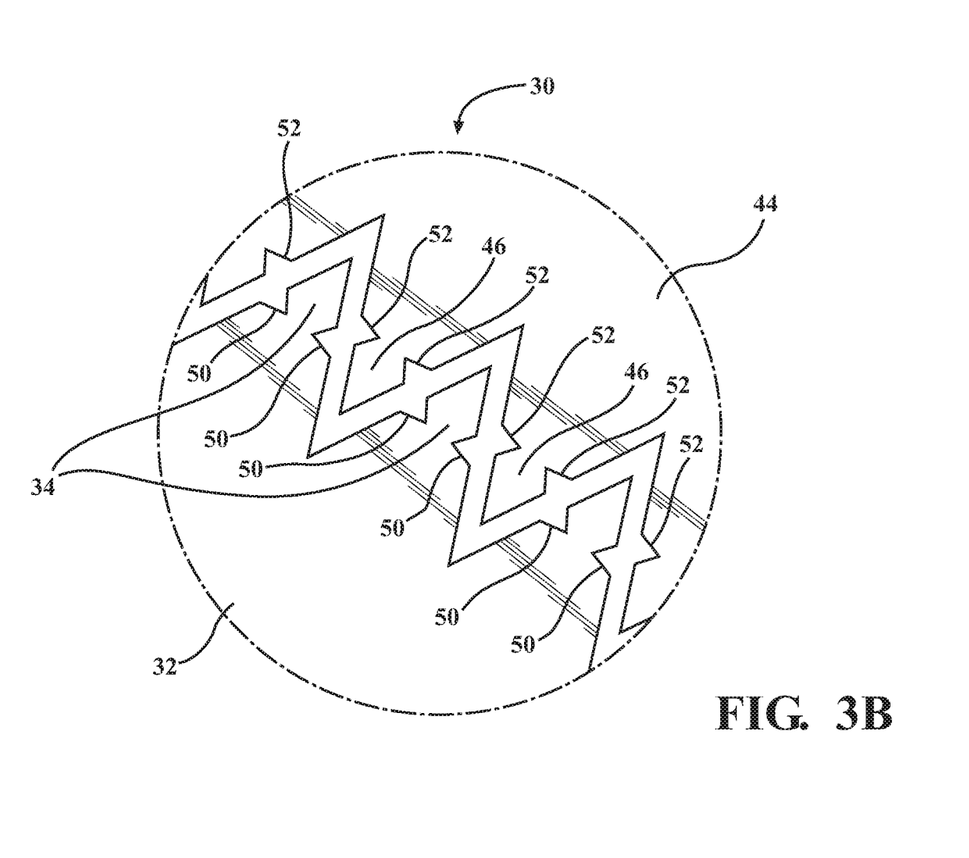
FIG. 3B schematically depicts an enlarged view of a gear teeth of the recliner mechanism of FIG. 3A, according to one or more embodiments shown and described herein.

Referring to FIGS. 3A and 3B, the front seat assembly 18 includes a recliner mechanism 30 connected to the seat cushion frame 20 and the seat back frame 24. The recliner mechanism 30 is moveable between a locked position, an unlocked position, and a disengaged positioned. In the locked position, the recliner mechanism 30 inhibits the seat back frame 24 from pivoting about the pivot axis P. In the unlocked position, the recliner mechanism 30 allows the seat back frame 24 to pivot about the pivot axis P. As will be described in greater detail below, the recliner mechanism 30 is movable from the locked position to the disengaged position upon application of a predetermined force on the seat back frame 24, specifically, the rear surface 24A of the seat back frame 24. In the disengaged position, the recliner mechanism 30 allows the seat back frame 24 to pivot about the pivot axis P. The recliner mechanism 30 includes a handle that upon actuation moves the recliner mechanism 30 from the locked position to the unlocked position to allow a user to pivot the seat back frame 24 to a desired position.

The recliner mechanism 30 includes an outer annular ring 32 having a plurality of inner teeth 34 providing on an inner edge of the outer annular ring 32. A rotational cam 36 is connected to the handle. Upon actuation of the handle, the rotational cam 36 rotates about the pivot axis P. The rotational cam 36 includes a cutout 38 that extends inwardly and an outwardly extending protrusion 40. A pair of posts 42 are biased inwardly towards the pivot axis P by a biasing member.

The recliner mechanism 30 further includes a pair of engagement members 44. Each of the pair of engagement members 44 include a plurality of outer teeth 46 provided on an outer edge of the engagement members 44 with respect to the pivot axis P. Each of the pair of engagement members 44 include a recess 48 having a shape corresponding to a shape of the posts 42.

In the locked position, outer teeth 46 of the engagement members 44 engage with the inner teeth 34 of the outer annular ring 32. The engagement between the outer teeth 46 and the inner teeth 34 inhibits the pivoting of the seat back frame 24 about the pivot axis P. Further, in the locked position, the protrusion 40 of the rotational cam 36 presses the posts 42 into the recesses 46 of the engagement members 44 to force the outer teeth 46 into engagement with the inner teeth 34 of the outer annular ring 32.

One of the engagement members 44 and the outer annular ring 32 are connected to the seat back frame 24 and the other of the engagement members 44 and the outer annular ring 32 are connected to the seat cushion frame 20. As such, the engagement of the inner teeth 34 of the outer annular ring 32 and the outer teeth 46 of the engagement members 44, in the locked position, releasably secures the seat cushion frame 20 to the seat back frame 24 to prevent the seat back frame 24 from pivoting about the pivot axis P.

Upon actuation of the handle, which is connected to the rotational cam 36, the rotational cam 36 rotates in the direction of arrow B 1. Upon movement of the rotational cam 36 in the direction of arrow B 1, the protrusion 40 rotates out of contact of the post 42 and the post 42 is biased by the biasing member inwardly towards the pivot axis P. As the post 42 is no longer pressed into the recess 48 of the engagement member 44, the post 42 moves into the cutout 38 of the rotational cam 36 due to the biasing force of the biasing member attached to the post 42. As the post 42 no longer presses the engagement members 44 outwardly, the engagement members 44 are biased by a biasing member inwardly towards the pivot axis P. As the engagement members 44 moves inwardly, with respect to the pivot axis P, the outer teeth 46 of the engagement members 44 are moved out of engagement with the inner teeth 34 of the outer annular ring 32 to move the recliner mechanism 30 from the locked position to the unlocked position to allow the seat back frame 24 to pivot about the pivot axis P.

Referring to FIG. 3B, the plurality of inner teeth 34 of the outer annular ring 32 include inwardly extending notches 50 and the plurality of outer teeth 46 of the engagement members 44 include inwardly extending notches 52. The notches 50 remove a portion of the material of the inner teeth 34 so as to form a shearing portion of the outer annular ring 32. The notches 52 remove a portion of the material of the outer teeth 46 so as to form a shearing portion of the engagement members 44. The notches 50 and the notches 52 reduce shear strength of recliner mechanism 30 such that the inner teeth 34 and the outer teeth 46 that are frangible upon application of a predetermined force.

The predetermined force required to fracture the inner teeth 34 and the outer teeth 46 by shearing is set to be higher than a force that acts upon the recliner mechanism 30 through the seat back frame 24 during normal use of the front seat assembly 18. As will be described in greater detail below, the predetermined force is set lower than a force from the knees K of the rear occupant O which will be applied to the seat back frame 24 during a frontal collision.

In some embodiments, the predetermine force is set to be higher than 1 kN, 1.5 kN, or 2 kN, ±5% or ±10%, which is applied to the recliner mechanism 30 through the seat back frame 24 during normal use of the front seat assembly 18. The predetermined force is set to be lower than a collision force applied to the recliner mechanism 30 due to the knees K of the rear occupant O contacting the rear surface 24A of the seat back frame 24. Specifically, the predetermined force is set to be lower than 4 kN, 4.5 kN, or 5 kN, ±5% or ±10%.

Figure 4:
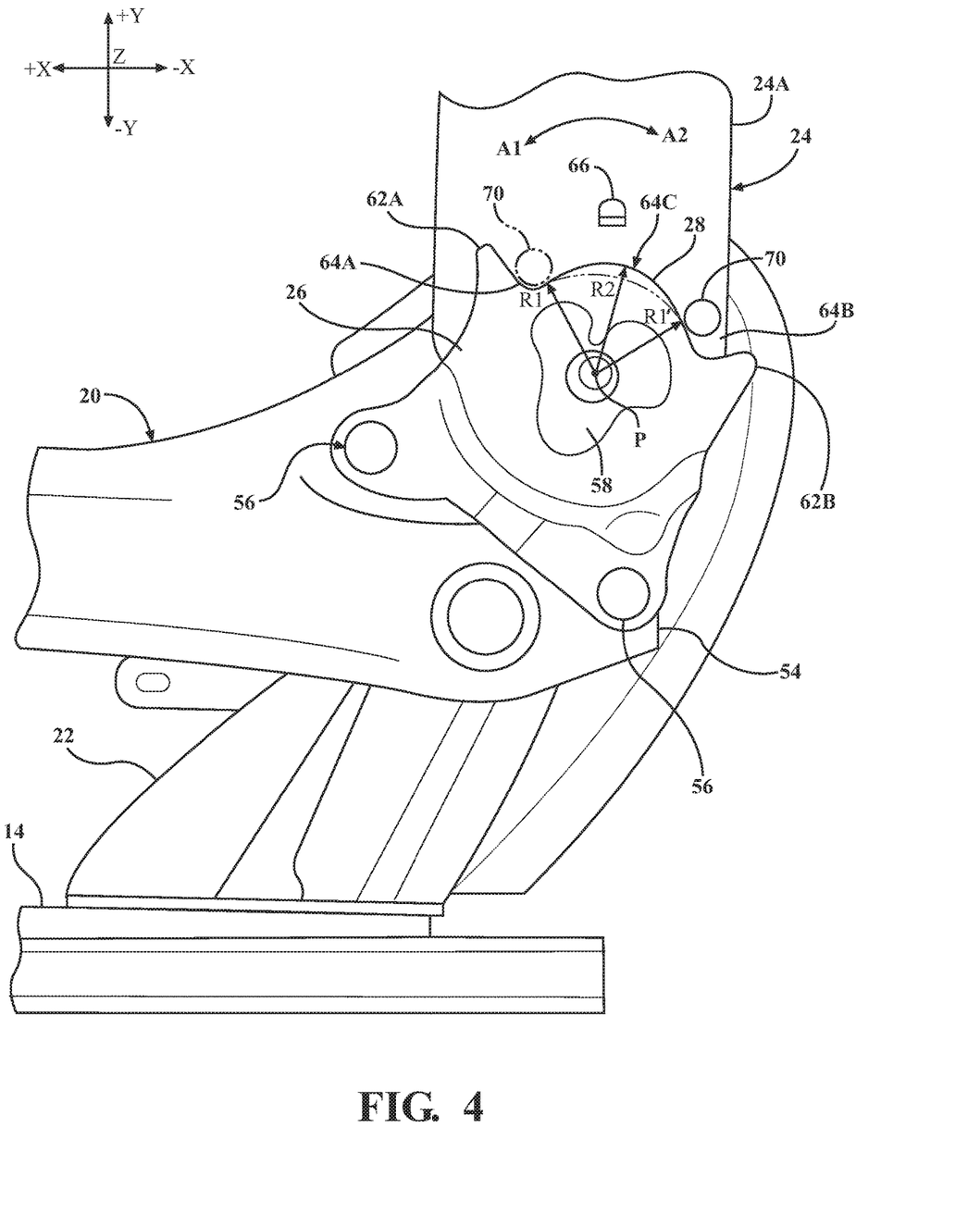
FIG. 4 schematically depicts a partial side view of the seat assembly of FIG. 1, according to one or more embodiments shown and described herein.

Referring to FIG. 4, the bracket 26 is fixed to the rear end 54 of the seat cushion frame 20. In some embodiments, the bracket 26 is fixed to the seat cushion frame 20 by a pair of fasteners 56. In some other embodiments, the bracket 26 is formed integrally with the seat cushion frame 20 as a one-piece monolithic structure.

The bracket 26 includes an opening 58 through which a portion of a pivot rod 60 extends. The pivot rod 60 extends along the pivot axis P and facilitates the pivoting of the seat back frame 24 about the pivot axis P. In some embodiments, the pivot rod 60 is connected to the handle, the rotational cam 36, or both the handle and the rotational cam 36.

The cam surface 28 of the bracket 26 is positioned above the opening 58 and the pivot axis P. The bracket 26 includes an upwardly extending front stopper 62A and an upwardly extending rear stopper 62B, in the vehicle vertical direction. The cam surface 28 extends between a front end portion 64A and a rear end portion 64B. The front end portion 64A of the cam surface 28 is positioned rearwardly adjacent of the front stopper 62A, in the vehicle longitudinal direction forwardly. The rear end portion 64B of the cam surface 28 is positioned forwardly adjacent of the rear stopper 62B, in the vehicle longitudinal direction. The cam surface 28 extends on an outer peripheral surface of the bracket 26. Specifically, the cam surface 28 forms the outer peripheral surface of the bracket 26 between the front stopper 62A and the rear stopper 62B.

A stopper flange 66 extends outwardly, in the vehicle width direction, from the seat back frame 24. During forward pivoting of the seat back frame 24, in the direction of arrow A1, the stopper flange 66 contacts the front stopper 62A to limit the forward pivoting of the seat back frame 24 about the pivot axis P. During rearward pivoting of the seat back frame 24, in the direction of arrow A2, the stopper flange 66 contacts the rear stopper 62B to limit the rearward pivoting of the seat back frame 24 about the pivot axis P.

The cam surface 28 is curvilinear and is formed with a generally partial elliptical manner about the pivot axis P. Specifically, the cam surface 28 has a curvilinear shape that is formed with an inconsistent radius about the pivot axis P such that a distance between the cam surface 28 and the pivot axis P varies along the cam surface 28. Specifically, a distance between the pivot axis P and the front end portion 64A of the cam surface 28 is R1 and a distance between the pivot axis P and the rear end portion 64B of the cam surface 28 is R1'. In some embodiments, the distance R1 between the pivot axis P and the front end portion 64A is substantially equal to the distance R1' between the pivot axis P and the rear end portion 64B.

A distance between the pivot axis P and an intermediate portion 64C, positioned between the front end portion 64A and the rear end portion 64B, of the cam surface 28 is R2. The distance R2 between the pivot axis P and the intermediate portion 64C is larger than the distance R1 between the pivot axis P and the front end portion 64A and larger than the distance R1' between the pivot axis P and the rear end portion 64B of the cam surface 28.

In some other embodiments, the distance R1 between the pivot axis P and the front end portion 64A is larger than the distance R1' between the pivot axis P and the rear end portion 64B. In such embodiments, the distance R2 between the pivot axis P and the intermediate portion 64C is larger than both the distance R1 between the pivot axis P and the front end portion 64A and the distance R1' between the pivot axis P and the rear end portion 64B.

In some other embodiments, the distance R1' between the pivot axis P and the rear end portion 64B is larger than the distance R1 between the pivot axis P and the front end portion 64A. In such embodiments, the distance R2 between the pivot axis P and the intermediate portion 64C is larger than both the distance R1 between the pivot axis P and the front end portion 64A and the distance R1' between the pivot axis P and the rear end portion 64B. In some other embodiments, the cam surface 28 is formed with a ridges, waves, or a textured surface so as to increase a frictional coefficient of the cam surface 28.

Figure 5A:
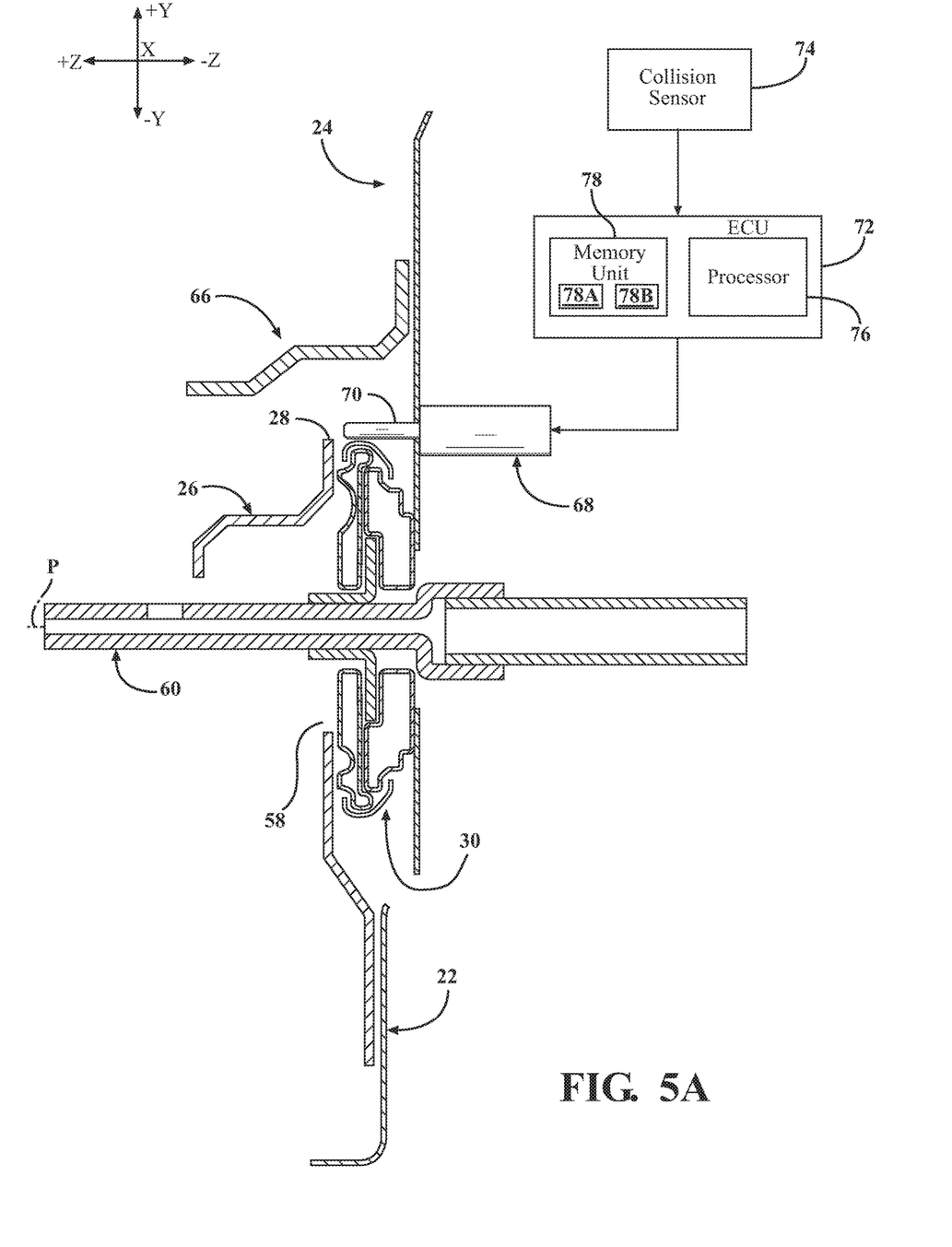
FIG. 5A schematically depicts a partial cross-sectional side view of the seat assembly of FIG. 4, with a pin in a disengaged position, according to one or more embodiments shown and described herein.
Figure 5B:
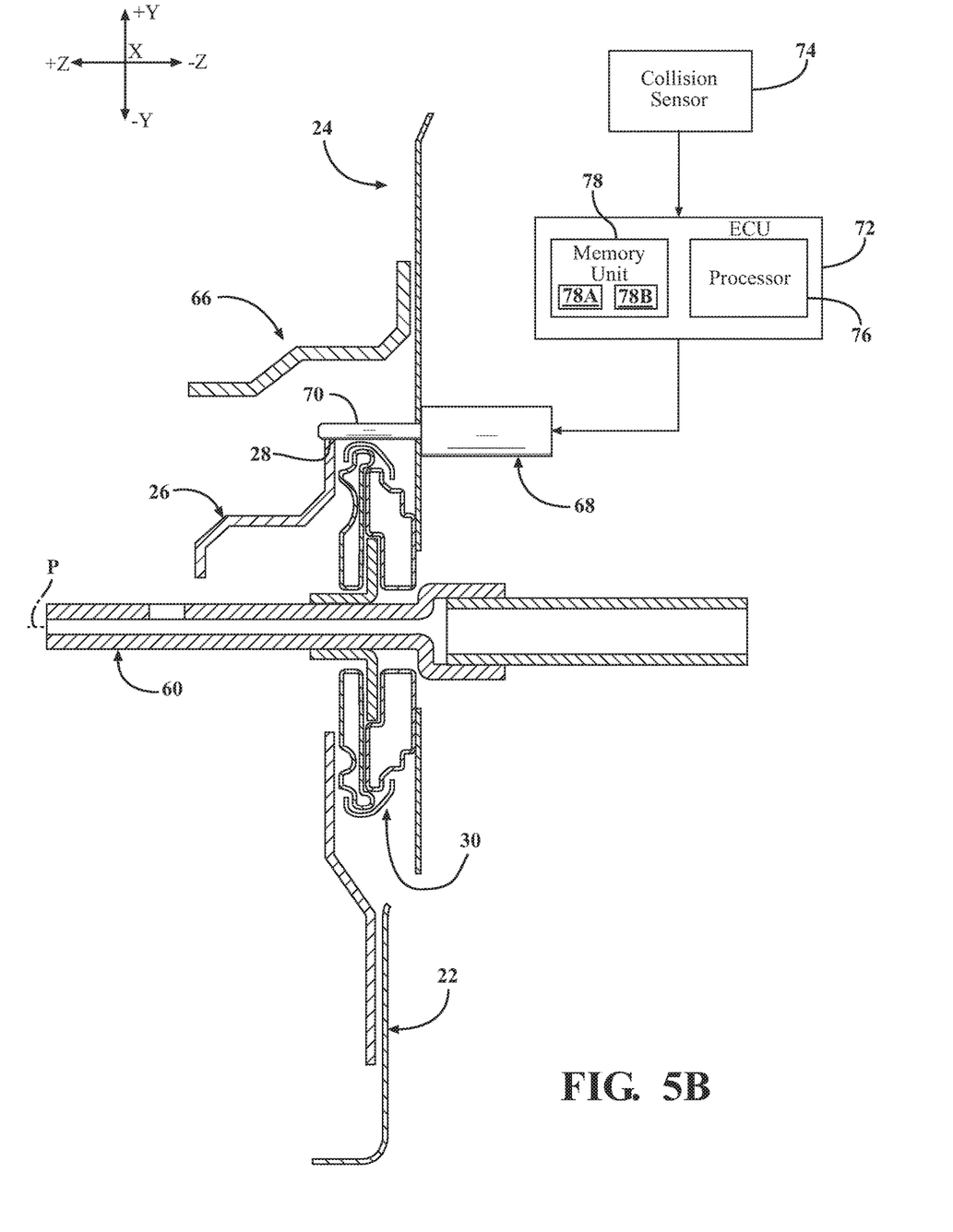
FIG. 5B schematically depicts a partial cross-sectional side view of the seat assembly of FIG. 4, with the pin in an engaged position, according to one or more embodiments shown and described herein.

Referring to FIGS. 5A and 5B, the front seat assembly 18 includes a pin actuator 68 fixed to the seat back frame 24 at a position above the pivot axis P in the vehicle vertical direction. The pin actuator 68 includes a pin 70 movable by the pin actuator 68 between a disengaged position and an engaged position. As shown in FIG. 5A, the pin 70 is spaced apart from the cam surface 28 in the disengaged position. As shown in FIG. 5B, the pin 70 contacts the cam surface 28 of the bracket 26 in the engaged position. In both the engaged position and the disengaged position, the pin 70 is positioned below the stopper flange 66, in the vehicle vertical direction.

The front seat assembly 18 also includes an electronic control unit (ECU) 72 and a collision sensor 74. The electronic control unit 72 is in communication with the pin actuator 68 and the collision sensor 74. The electronic control unit 72 includes a processor 76 and a memory unit 78 coupled to the processor 76. The processor 76 includes processing components operable to receive and execute instructions from the memory unit 78.

The memory unit 78 stores detection logic 78a and control logic 78b. The detection logic 78a and the control logic 78b may each include a plurality of different pieces of logic, each of which may be embodied as a computer program, firmware, and/or software/hardware.

In some embodiments, the memory unit 78 is configured as volatile and/or nonvolatile memory and as such may include random access memory (SRAM, DRAM, and/or other types of RAM), flash memory, secure digital (SD) memory, registers, compact discs, digital versatile discs (DVD), and/or other types of nontransitory computer readable mediums. Depending on the particular embodiments, these nontransitory computer readable mediums may reside within the electronic control unit 72 and/or external to the electronic control unit 72.

The collision sensor 74 is configured to detect information related to a presence or absence of a frontal collision of the vehicle 10. In some embodiments, the collision sensor 74 detects information related to an actual frontal collision of the vehicle 10. In some other embodiments, the collision sensor 74 is a plurality of sensors that detect information related to a prediction of a presence or absence of a frontal collision of the vehicle 10.

The detection logic 78a is executable by the processor 76 to detect one or more signals output from the collision sensor 74. For example, the detection logic 78a is configured to cause the processor 76 to determine the presence or absence of a front collision of the vehicle 10 based on the signal output from the collision sensor 74. Specifically, processor 76 determines the presence or absence of the frontal collision based on output signals from the collision sensor 74.

Upon determination of the presence of the frontal collision by the processor 76, the control logic 78b is executable by the processor 76 to control operation of the pin actuator 68. For example, the control logic 78b is configured to cause the processor 76 to actuate the pin actuator 68. Specifically, the processor 76 controls the pin actuator 68 to move the pin 70 from the disengaged position, in which the pin 70 is spaced apart from the cam surface 28, to the engaged position, in which the pin 70 contacts the cam surface 28.

The bracket 26, the cam surface 28, the pin actuator 68, the pin 70, the electronic control unit 72, and the collision sensor 74 form an energy absorption mechanism that absorbs energy in a controlled manner due to the knees K of the rear occupant O contacting the rear surface 24A at the knee load plate of the seat back frame 24 during a frontal collision.

In order to facilitate a better understanding of the front seat assembly 18, discussion on its operation will be discussed. Initially, the front seat assembly 18 is in a normal operating state in which the recliner mechanism 30 is in a locked position and the pin 70 is in the disengaged position. In the locked position, the inner teeth 34 of the outer annular ring 32 are engage with the outer teeth 46 of the pair of engagement members 44 to inhibit the pivoting of the seat back frame 24 with respect to the seat cushion frame 20 about the pivot axis P. In the disengaged position, the pin 70 is spaced apart from the cam surface 28.

Upon determination of the presence of a frontal collision by the processor 76, based on output signals from the collision sensor 74, the processor 76 controls the pin actuator 68 to move the pin 70 from the disengaged position to the engaged position. In some embodiments, the processor 76 controls the pin actuator 68 to move from the disengaged position to the engaged position simultaneously with the determination of the precedence of a frontal collision. In some other embodiments, the processor 76 controls the pin actuator 68 to move from the disengaged position to the engaged position after an elapse of a predetermined period of time after the determination of the presence of the frontal collision by the processor 76. The predetermined time period is determined so as to coincide with or after the fracture of the inner teeth 34 and the outer teeth 46 such that the pin 70 is moved to the engaged position after the recliner mechanism 30 is moved from the locked position to the disengaged position due to the shearing of the inner teeth 34 and the outer teeth 46.

Due to the forces applied by the frontal collision, knees K of the rear occupant O contact the rear surface 24A, at the knee loading plate, of the seat back frame 24. As the force applied to the recliner mechanism 30 through the seat back frame 24, due to the contact of the knees K of the rear occupant O and the seat back frame 24, is larger than the predetermined force required to fracture the inner teeth 34 and the outer teeth 46 by shearing, at least one of the inner teeth 34 and the outer teeth 46 are fractured at the notches 50 and the notches 52, respectively. As the inner teeth 34 are no longer in engaged with the outer teeth 46, the recliner mechanism 30 is in the disengaged position which no longer inhibits the pivoting of the seat back frame 24 with respect to the seat cushion frame 20 about the pivot axis P.

As the seat back frame 24 is permitted to pivot about the pivot axis P with respect to the seat cushion frame 20 and as the knees K of the rear occupant O are applying a force to the seat back frame 24, the seat back frame 24 is pivoted in the direction of arrow A1 to increase a distance between the head H of the rear occupant O and the headrest 25 of the seat back frame 24.

As the processor 76 controls the pin actuator 68 to move the pin 70 from the disengaged position to the engaged position, the contact between the pin 70 and the cam surface 28 increases a force required to pivot the seat back frame 24 about the pivot axis P. Due to the increase in force required to pivot the seat back frame 24 about the pivot axis P, the contact between the pin 70 and the cam surface 28 allows for a controlled forward pivoting of the seat back frame 24 so as to absorb energy transferred to the seat back frame 24 due to the contact of the knees K of the rear occupant O and the seat back frame 24 and increase a distance between the head H of the rear occupant O and the headrest 25 of the seat back frame 24.

As the knees K of the rear occupant O continue to apply a force to the rear surface 24A of the seat back frame 24 during the frontal collision, the contact between the pin 70 and the cam surface 28 absorbs at least a portion of the energy from the applied force due to the increase in friction between the pin 70 and the cam surface 28. The at least partial absorption of energy controls the forward pivoting of the seat back frame 24, in the direction of arrow A1, and increases the distance between the head H of the rear occupant O and the seat back frame 24 including the headrest 25. Specifically, the pin 70 maintains contact with the cam surface 28 as the seat back frame 24 pivots in the direction of arrow A1 from an initial position, shown in solid in FIG. 4, along the cam surface 28 to an end position of the pin 70, shown in the broken line in FIG. 4.

Figure 6:
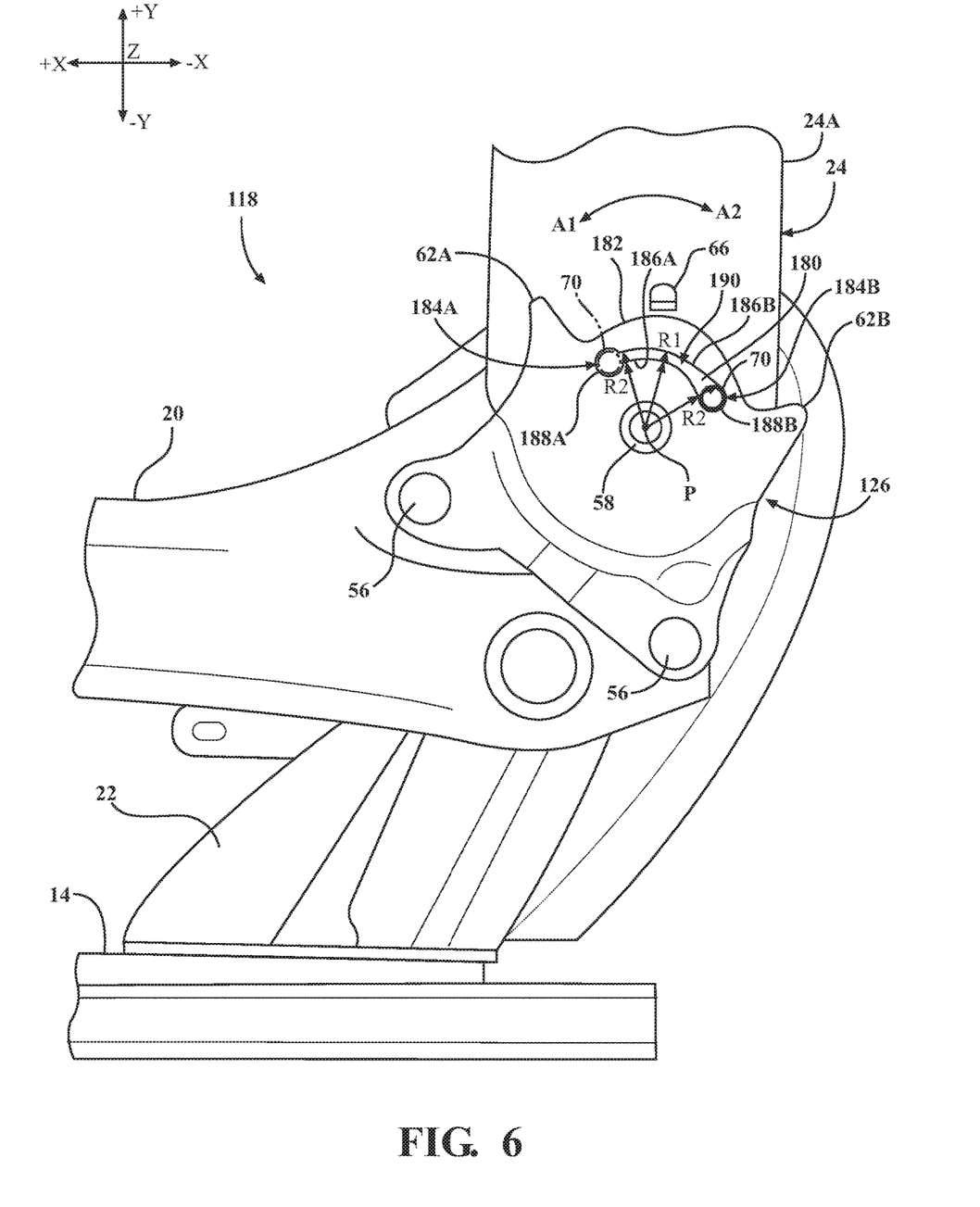
FIG. 6 schematically depicts a partial side view of a seat assembly, according to one or more embodiments shown and described herein.
Figure 7A:
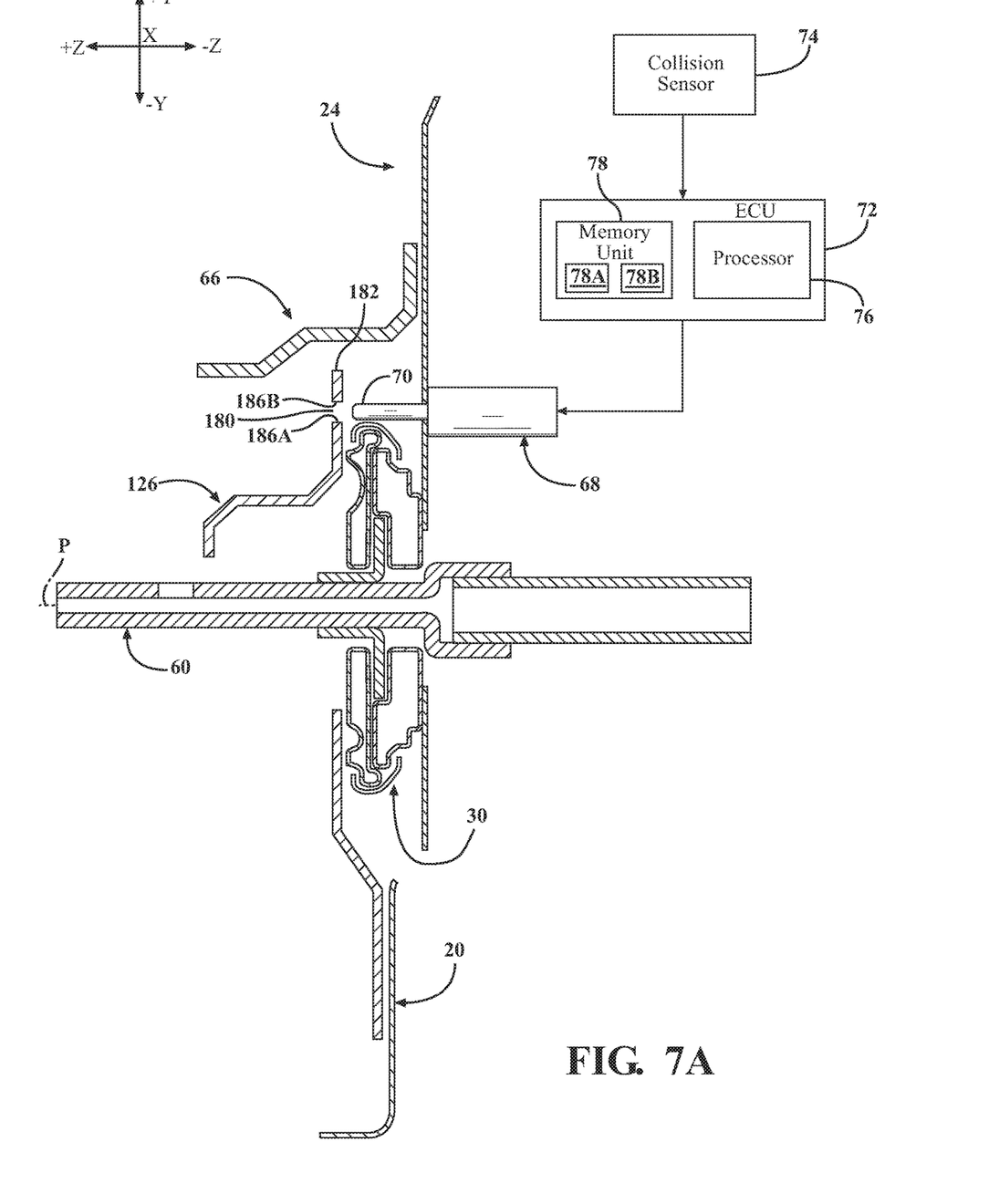
FIG. 7A schematically depicts a partial cross-sectional side view of the seat assembly of FIG. 6, with the pin in the disengaged position, according to one or more embodiments shown and described herein.
Figure 7B:
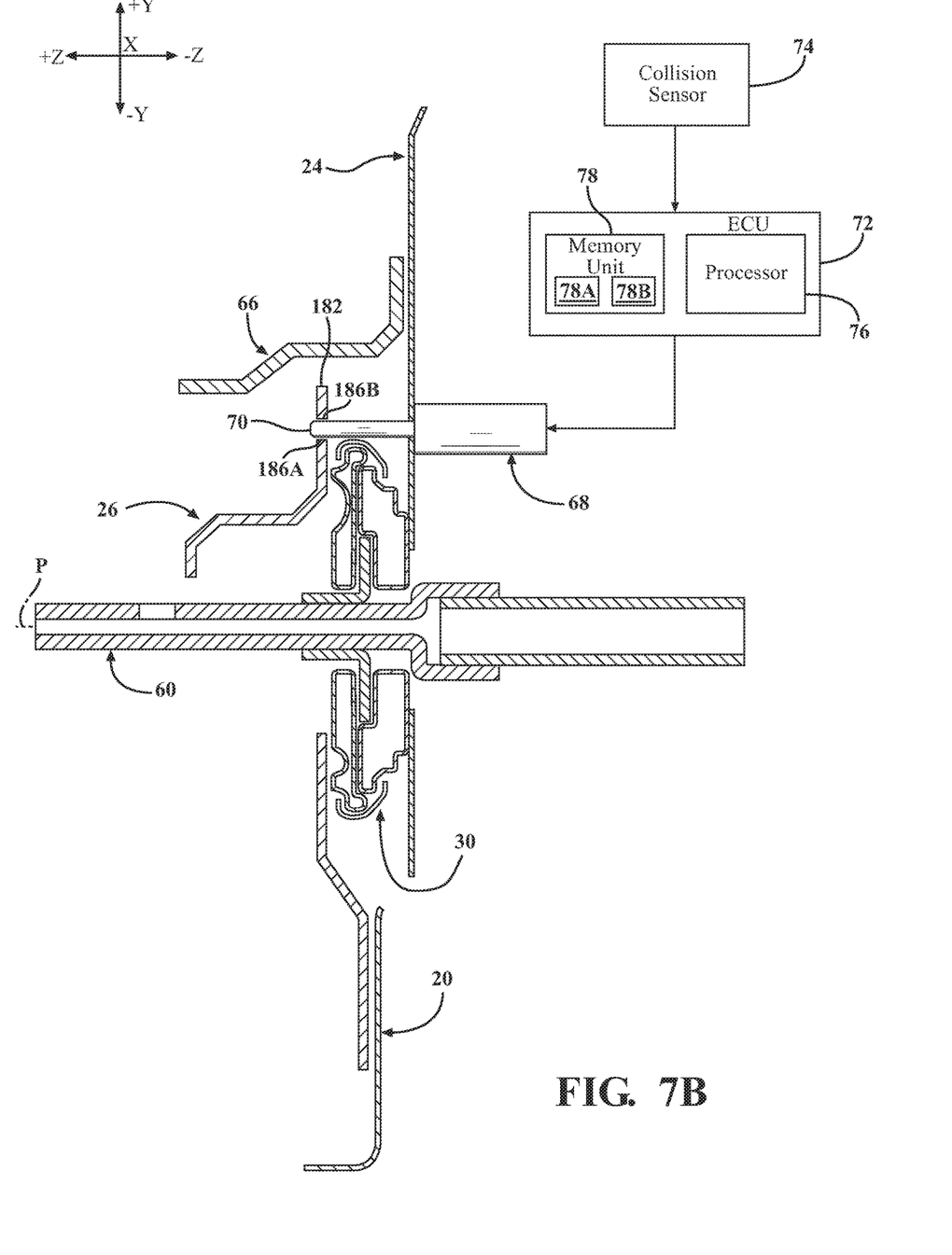
FIG. 7B schematically depicts a partial cross-sectional side view of the seat assembly of FIG. 6 with the pin in the engaged position, according to one or more embodiments shown and described herein.

Referring to FIGS. 6 and 7A-7B, a front seat assembly is generally illustrated at 118. The front seat assembly 118 is similar to the front seat assembly 18 except that the front seat assembly 118 includes a bracket 126 having an elongated slot 180. The elongated slot 180 is positioned inwardly from an outer peripheral surface 182 of the bracket 126 with respect to the pivot axis P. The elongated slot 180 includes a first or front end portion 184A and a second or rear end portion 184B, and a pair of surfaces 186 that extend between the front end portion 184A and the rear end portion 184B. At least one of the pair of surfaces 186A, 186B is formed as a cam surface in which a distance between the pivot axis P and the at least one of the pair of surfaces 186 varies along the at least one of the pair of surfaces 186A and 186B. In some other embodiments, the cam surface of the at least one of the pair of surfaces 186A and 186B is formed with a ridges, waves, or a textured surface so as to increase a frictional coefficient of the cam surface 28.

Specifically, the front end portion 184A of the elongated slot 180 is formed with a first or front opening 188A positioned rearwardly adjacent the front end portion 184A. The rear end portion 184B of the elongated slot 180 is formed with a second or rear opening 188B positioned forwardly adjacent the rear end portion 184B. A width of the elongated slot 180 narrows between the front opening 188A and the rear opening 188B.

A distance between at least one of the pair of surfaces 186A, 186B and the pivot axis P varies along the elongated slot 180. Specifically, a distance between the pivot axis P and the surfaces 186A, 186B inwardly adjacent the front opening 188A is R1 and a distance between the pivot axis P and the surfaces 186A, 186B inwardly adjacent the rear opening 188B is R1'. In some embodiments, the distance R1 between the pivot axis P and the surfaces 186A, 186B inwardly adjacent the front opening 188A is substantially equal to the distance R1' between the pivot axis P and the surfaces 186A, 186B inwardly adjacent the rear opening 188B.

A distance between the pivot axis P and an intermediate portion 190 of the surfaces 186A, 186B of the elongated slot 180, positioned between the front opening 188A and the rear opening 188B is R2. The distance R2 between the pivot axis P and the intermediate portion 190 is larger than the distance R1 between the pivot axis P and the surfaces 186A, 186B inwardly adjacent the front opening 188A and larger than the distance R1' between the pivot axis P and the surfaces 186A, 186B inwardly adjacent the rear opening 188B.

In some other embodiments, the distance R1 between the pivot axis P and the surfaces 186A, 186B inwardly adjacent the front opening 188A is larger than the distance R1' between the pivot axis P and the surfaces 186A, 186B inwardly adjacent the rear opening 188B. In such embodiments, the distance R2 between the pivot axis P and the intermediate portion 190 is larger than both the distance R1 between the pivot axis P and the surfaces 186A, 186B inwardly adjacent the front opening 188A and the distance R1' between the pivot axis P and the surfaces 186A, 186B inwardly adjacent the rear opening 188B.

Accordingly, a width of the elongated slot 180 narrows as the elongated slot 180 moves from the rear opening 188B towards the front opening 188A in the vehicle longitudinal direction.

Referring to FIG. 7A, the pin actuator 68 is in the disengaged position in which the pin 70 is spaced apart from the elongated slot 180, specifically, the pin 70 is not received within the elongated slot 180 and as such the pin 70 does not contact the surfaces 186A, 186B of the elongated slot 180.

Referring to FIG. 7B, upon determination of the presence of the frontal collision, the processor 76 controls the pin actuator 68 to move the pin 70 from the disengaged position to the engaged position. In the engaged position, the pin 70 is received within the elongated slot 180, specifically, the pin 70 is received between the surfaces 186A, 186B of the elongated slot 180.

The bracket 126, the elongated slot 180, the pin actuator 68, the pin 70, the electronic control unit 72, and the collision sensor 74 form an energy absorption mechanism that absorbs energy in a controlled manner due to the rear occupant O contacting the seat back frame 24 during a frontal collision.

In some embodiments, the elongated slot 180 is positioned such that the pin 70 initially is received within the rear opening 188B of the elongated slot 180 upon the pin 70 being moved from the disengaged position to the engaged position. In some other embodiments, the pin 70 is received directly within the elongated slot 180 upon the pin 70 being moved from the disengaged position to the engaged position.

The contact between the pin 70 and the surfaces 186A, 186B of the elongated slot 180 increases a force required to pivot the seat back frame 24 about the pivot axis P. Due to the increase in force required to pivot the seat back frame 24 about the pivot axis P, the contact between the pin 70 and the surfaces 186A, 186B of the elongated slot 180 allows for a controlled forward pivoting of the seat back frame 24 so as to absorb energy transferred to the seat back frame 24 due to the contact of the knees K of the rear occupant O and the seat back frame 24 and increase a distance between the head H of the rear occupant O and the headrest 25 of the seat back frame 24.

Specifically, as a width of the elongated slot 180 narrows as the elongated slot 180 moves from the rear opening 188B towards the front opening 188A, the force required to pivot the seat back frame 24 about the pivot axis P increases as the pin 70 travels along the elongated slot 180 from the rear opening 188B, or inwardly adjacent the rear opening 188B, towards the front opening 188A.

As the knees K of the rear occupant O continue to apply a force to the rear surface 24A of the seat back frame 24 during the frontal collision, the contact between the pin 70 and the cam surface of the pair of surfaces 186A and 186B, absorbs at least a portion of the energy from the applied force due to the increase in friction between the pin 70 and the elongated slot 180. The at least partial absorption of energy controls the forward pivoting of the seat back frame 24, in the direction of arrow A1, and increases the distance between the head H of the rear occupant O and the seat back frame 24 including the headrest 25. Specifically, the pin 70 maintains contact with the cam surface of the pair of surfaces 186A and 186B of the elongated slot 180 as the seat back frame 24 pivots in the direction of arrow A1 from an initial position, shown in solid in FIG. 6, along the cam surface to an end position of the pin 70, shown in the broken line in FIG. 6.

It should now be understood that the front seat assembly that includes an energy absorption mechanism for absorbing energy from the contact of the knees of the rear occupant to increase a distance between the head of the rear occupant so as to reduce the occurrence of the head of the rear occupant from contacting the front seat assembly.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A seat assembly of a vehicle having a floor and a rear seat assembly positioned rearward of the seat assembly, the seat assembly comprising:

a seat cushion frame connected to the floor of the vehicle;

a seat back frame pivotally connected to the seat cushion frame about a pivot axis;

a bracket fixed to the seat cushion frame, the bracket includes a cam surface, a distance between the cam surface and the pivot axis varies along the cam surface;

a pin actuator that includes a pin, the pin actuator fixed to the seat back frame, the pin actuator configured to move the pin between a disengaged position and an engaged position, in the disengaged position the pin is spaced apart from the cam surface of the bracket and in the engaged position the pin contacts the cam surface of the bracket to increase a force required to pivot the seat back frame about the pivot axis due to the contact between the pin and the cam surface of the bracket;

a sensor configured to detect a front collision of the vehicle; and an electronic control unit including a processor and a memory unit that is coupled to the processor, the memory unit stores logic that, when executed by the processor, causes the electronic control unit to:

determine whether the sensor detects the front collision of the vehicle; and in response to determining that the sensor detected the front collision of the vehicle, control the pin actuator to move the pin from the disengaged position to the engaged position.

2. The seat assembly of claim 1, wherein the cam surface is provided on an outer peripheral surface of the bracket.

3. The seat assembly of claim 1, wherein the bracket includes an elongated slot and the cam surface forms one of a pair of surfaces of the elongated slot.

4. The seat assembly of claim 3, wherein the elongated slot includes a first end and an opposite second end, and wherein a width of the elongated slot narrows between the first end and the second end.

5. The seat assembly of claim 1 further comprising:

a recliner mechanism connected to the seat cushion frame and the seat back frame, the recliner mechanism movable between a locked position and an unlocked position, in the locked position the recliner mechanism inhibits the seat back frame from pivoting about the pivot axis and in the unlocked position the recliner mechanism allows the seat back frame to pivot about the pivot axis.

6. The seat assembly of claim 5, wherein the recliner mechanism is movable between the locked position and a disengaged position upon application of a predetermined force on a rear surface of the seat back frame.

7. The seat assembly of claim 6, wherein the recliner mechanism includes an outer annular ring having a plurality of inner teeth and an engagement member having a plurality of outer teeth that engage with the inner teeth in the locked position of the recliner mechanism.

8. The seat assembly of claim 7, wherein at least one of the plurality of outer teeth and the plurality of inner teeth include notches, and wherein upon application of the predetermined force on the rear surface of the seat back frame, the at least one of the plurality of outer teeth and the plurality of inner teeth fractures at the notches to move the recliner mechanism from the locked position to the disengaged position.

9. A vehicle comprising:

a rear seat assembly; and a front seat assembly provided forward of the rear seat assembly, the front seat assembly including:

a seat cushion frame connected to a floor of the vehicle;

a seat back frame pivotally connected to the seat cushion frame about a pivot axis;

a bracket fixed to the seat cushion frame, the bracket includes a cam surface, a distance between the cam surface and the pivot axis varies along the cam surface;

a pin actuator that includes a pin, the pin actuator fixed to the seat back frame, the pin actuator configured to move the pin between a disengaged position and an engaged position, in the disengaged position the pin is spaced apart from the cam surface of the bracket and in the engaged position the pin contacts the cam surface of the bracket to increase a force required to pivot the seat back frame about the pivot axis due to the contact between the pin and the cam surface of the bracket;

a sensor configured to detect a front collision of the vehicle; and an electronic control unit including a processor and a memory unit that is coupled to the processor, the memory unit stores logic that, when executed by the processor, causes the electronic control unit to:

determine whether the sensor detects the front collision of the vehicle; and in response to determining that the sensor detected the front collision of the vehicle, control the pin actuator to move the pin from the disengaged position to the engaged position.

10. The vehicle of claim 9, wherein the cam surface is provided on an outer peripheral surface of the bracket.

11. The vehicle of claim 9, wherein the bracket includes an elongated slot and the cam surface forms one of a pair of surfaces of the elongated slot.

12. The vehicle of claim 11, wherein the elongated slot a first end and an opposite second end, and wherein a width of the elongated narrows between the first end and the second end.

13. The vehicle of claim 8, wherein the front seat assembly further comprises:

a recliner mechanism connected to the seat cushion frame and the seat back frame, the recliner mechanism movable between a locked position and an unlocked position, in the locked position the recliner mechanism inhibits the seat back frame from pivoting about the pivot axis and in the unlocked position the recliner mechanism allows the seat back frame to pivot about the pivot axis.

14. The vehicle of claim 13, wherein the recliner mechanism is movable between the locked position and a disengaged position upon application of a predetermined force on a rear surface of the seat back frame.

15. The vehicle of claim 14, wherein the recliner mechanism includes an outer annular ring having a plurality of inner teeth and an engagement member having a plurality of outer teeth that engage with the inner teeth in the locked position of the recliner mechanism.

16. The vehicle of claim 15, wherein at least one of the plurality of outer teeth and the plurality of inner teeth include notches, and wherein upon application of the predetermined force on the rear surface of the seat back frame, the at least one of the plurality of outer teeth and the plurality of inner teeth fractures at the notches to move the recliner mechanism from the locked position to the disengaged position.

17. A method of absorbing energy from a rear occupant of rear seat assembly of a vehicle contacting a front seat assembly positioned forward of the rear seat assembly, the method comprising:

providing the front seat assembly with a seat cushion frame connected to a floor of the vehicle, a seat back frame pivotally connected to the seat cushion frame about a pivot axis, a bracket fixed to the seat cushion frame, the bracket includes a cam surface, a distance between the cam surface and the pivot axis varies along the cam surface, a pin actuator that includes a pin, the pin actuator fixed to the seat back frame, the pin actuator configured to move the pin between a disengaged position and an engaged position, in the disengaged position the pin is spaced apart from the cam surface of the bracket and in the engaged position the pin contacts the cam surface of the bracket to increase a force required to pivot the seat back frame about the pivot axis due to the contact between the pin and the cam surface of the bracket;

determining a presence or absence of a front collision of the vehicle; and in response to determining the presence of the front collision of the vehicle, control the pin actuator to move the pin from the disengaged position to the engaged position.

18. The method of claim 17, wherein the cam surface is provided on an outer peripheral surface of the bracket.

19. The method of claim 17, wherein the bracket includes an elongated slot and the cam surface forms one of a pair of surfaces of the elongated slot.

20. The method of claim 17, wherein the front seat assembly includes a recliner mechanism connected to the seat cushion frame and the seat back frame, the recliner mechanism movable between a locked position and an unlocked position, in the locked position the recliner mechanism inhibits the seat back frame from pivoting about the pivot axis and in the unlocked position the recliner mechanism allows the seat back frame to pivot about the pivot axis, and wherein the recliner mechanism is configured to move from the locked position to the disengaged position upon application of a predetermined force on a rear surface of the seat back frame.

* * * * *

UNITED STATES PATENT AND TRADEMARK OFFICE
CERTIFICATE OF CORRECTION

PATENT NO. : 10,569,677 B1
APPLICATION NO. : 16/113003
DATED : February 25, 2020
INVENTOR(S) : Suk Jae Ham et al.

Page 1 of 1

It is certified that error appears in the above-identified patent and that said Letters Patent is hereby corrected as shown below:

On the Title Page

Item (72), inventor 3, city, delete "Aichi" and insert --Toyota, Aichi--, therefor.

Signed and Sealed this
Third Day of November, 2020

Andrei Iancu
*Director of the United States Patent and Trademark Office*